Aug. 21, 1923.
M. A. DEMONGEOT
1,465,545
MANUFACTURE OF ARTICLES OF GLASS AND THE LIKE
Filed June 23, 1913
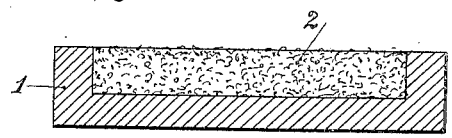
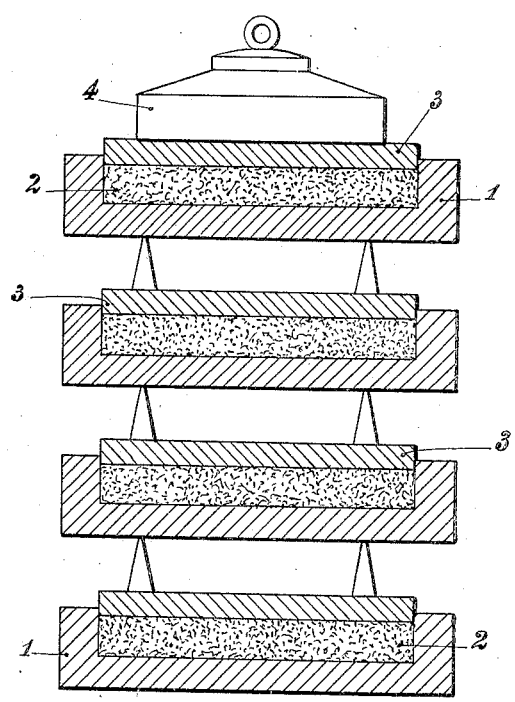

Patented Aug. 21, 1923.

1,465,545

UNITED STATES PATENT OFFICE.

MARCEL ARMAND DEMONGEOT, OF PARIS, FRANCE; JACOB NEADLE ADMINISTRATOR OF MARCEL ARMAND DEMONGEOT, DECEASED.

MANUFACTURE OF ARTICLES OF GLASS AND THE LIKE.

Application filed June 23, 1913. Serial No. 775,407.

(GRANTED UNDER THE PROVISIONS OF THE ACT OF MARCH 3, 1921, 41 STAT. L., 1313.)

*To all whom it may concern:*

Be it known that I, MARCEL ARMAND DEMONGEOT, manufacturer, of Paris, residing at Paris, 83 Rue du Cherche Midi, in the Republic of France, have invented certain new and useful Improvements in Manufacture of Articles of Glass and the like (for which I have filed applications in France July 3, 1912, Patent #446,218, in Germany Dec. 23, 1912, in Belgium June 7, 1913, and in Italy June 9, 1913); and I do hereby declare the following to be a full, clear, and exact description of the invention, such as will enable others skilled in the art to which it appertains to make and use the same.

This invention relates to the manufacture of articles of glass or other vitreous material which have been initially molded at a comparatively low temperature and has for its object to provide an improved process which consists in employing pressure during the heating of vitreous material in moulds of refractory earth, the advantage resulting from the employment of pressure being of enabling the vitrifiable material to be heated without risk that the vitrifiable material adheres to the mould.

In the processes as previously employed, the refractory earth of which the moulds were composed contained as an ingredient a certain quantity of lime in the form of calcium carbonate or sulphate for the purpose of preventing the formation of an aluminium silicate which would cause the vitrifiable material to adhere to the mould when heated. The presence of lime in the moulding earth was, however, open to the disadvantage that it was necessary to employ relatively fusible vitrifiable materials, that is to say materials which were fusible at a lower temperature than that necessary to effect the formation of calcium silicate which would itself cause the vitreous material to adhere to the mould.

I have discovered that the employment of pressure enables the vitrifiable material to be heated in the moulds at a temperature which is below the melting point of the vitrifiable material and therefore below the temperature tending to cause adhesion to the mould. This lower temperature corresponds to a softened or pasty condition of the particles of vitrifiable material and is insufficiently high to cause the formation of an aluminium silicate by contact with the mould itself which would cause the vitrifiable material to adhere thereto, and I am therefore able, by the process constituting the subject matter of the present invention, to reduce considerably the amount of lime incorporated in the moulding earth or even to dispense with this ingredient entirely.

An illustrative example of apparatus suitable for use in carrying out the process in question is shown in the accompanying drawing, wherein Figure 1 is a sectional view of a mold containing the material to be treated, and Figure 2 is a similar view of a pile of such molds as preferably arranged during the heating process.

A simple form of mold 1, is filled with the powdered vitrifiable material 2, over which a cover 3, of suitable material is placed, the same being so shaped as to be capable of applying pressure to the entire exposed surface of the material 2. Suitable pressure is applied to the cover in any appropriate manner, as by applying a weight 4.

In practice it is found convenient to pile up the molds one on another in the manner shown in Figure 2, whereby a single weight 4 compresses a number of bodies of material 2.

Accordingly the improved process of the invention consists in subjecting the vitrifiable material while being heated to a suitable pressure which may be conveniently effected in practice by means of a countermould or die loaded with a suitable weight. The effect of the pressure thus applied is as follows:—

As soon as the vitrifiable material commences to soften under the action of the heat to which it is subjected, the loaded countermould or die exerts a steady pressure upon the material and effects a welding of the particles of the material by mechanical action.

Consolidation of the particles into a solid mass is thus obtained at a temperature considerably lower than that which would be necessary according to the processes previously employed in which such consolidation is only obtained by the welding of the vitrifiable material under its own weight.

The advantages of the improved process are as follows:

1. The temperature of heating necessary is reduced.
2. The lime incorporated in the moulding earth in the form of sulphate or carbonate can be reduced in quantity or omitted altogether thus enabling much more solid moulds to be obtained since the calcium sulphate or carbonate employed form an inert material which adversely affected the cohesion of the refractory earth of the mould.
3. It is possible to arranged a number of moulds on the pile one upon the other and to place the necessary weight upon the top mould of the pile thus economizing space in the heating ovens.
4. A very large latitude in the temperature of heating is permitted owing to the great difference between the temperature at which the vitrifiable material softens and the temperature necessary to form an aluminium silicate which would cause adhesion to the mould, the number of spoilt pieces being thereby greatly reduced.
5. It is possible to employ less fusible varieties of glass or varieties which are more resistant and can be obtained at a lower price, since the reduction or omission of the amount of lime in the moulding earth enables the heating to be effected at a higher temperature necessary for more infusible kinds of glass without risk of the formation of a calcium silicate which would cause sticking.
6. The products obtained by the new process will conform to the shape of the mould and are consequently more uniform, since the vitrifiable material can only contract from above downwards under the action of the pressure, instead of being permitted to flow laterally as when the previous processes have been employed.

The vitrifiable material and the moulding earth are preferably arranged to have the same coefficient of expansion and the following composition of a suitable moulding earth may be given by way of example: potter's clay, kaolin, flint, in equal parts, this moulding earth being used for a powdered vitrifiable material obtained by previous melting in the melting-oven, and having for instance the following composition:

| | Parts. |
|---|---|
| Sand | 62 |
| Lime | 20 |
| Sodium sulphate | 18 |
| | 100 |

The greater the pressure to which the material is subjected, the lower is the temperature necessary to obtain satisfactory consolidation of the mass and the smaller is the proportion of calcium carbonate or sulphate necessary in the moulding earth in order to prevent adhesion to the mould.

In cases in which it is desired to omit altogether calcium carbonate or sulphate as an ingredient of the moulding earth the corresponding pressure upon the vitrifiable material which is required is approximately 30 to 40 grammes per square centimetre.

The improved process may evidently be carried out by means of any suitable apparatus and the invention is not limited in this respect nor to the particular compositions of the moulding earth and vitrifiable material given above by way of example, as these may be varied without exceeding the scope of the invention.

Having now particularly described and ascertained the nature of my said invention and in what manner the same is to be performed, I declare that what I claim is:

The process of producing a finished molded article from granular or powdered vitrifiable material in a manner to prevent sticking to the mold which consists in placing the material in the mold, raising it while in the mold to a temperature sufficient to soften it but lower than that which would cause sticking to the mold and, while it is being so heated in the mold, subjecting the material to an external pressure acting progressively during the heating operation so as to consolidate the mass in spite of its relatively low temperature.

In testimony whereof, I affix my signature, in presence of two witnesses.

MARCEL ARMAND DEMONGEOT.

Witnesses:
   EMILE G. MATHIS,
   LUCIEN MEMMINGER.